(12) United States Patent
Zhao et al.

(10) Patent No.: US 11,320,706 B2
(45) Date of Patent: May 3, 2022

(54) ARRAY SUBSTRATE, LIQUID CRYSTAL LIGHT CONTROL STRUCTURE AND LIQUID CRYSTAL DISPLAY PANEL HAVING ADJACENT PIXEL ELECTRODES WHOSE ORTHOGRAPHIC PROJECTIONS ON BASE SUBSTRATE ADJONING EACH OTHER

(71) Applicants: BEIJING BOE DISPLAY TECHNOLOGY CO., LTD., Beijing (CN); BOE TECHNOLOGY GROUP CO., LTD., Beijing (CN)

(72) Inventors: Tianxin Zhao, Beijing (CN); Shijun Wang, Beijing (CN); Ruichen Zhang, Beijing (CN); Hao Liu, Beijing (CN); Xiaoqing Peng, Beijing (CN); Jiao Li, Beijing (CN); Bo Feng, Beijing (CN); Haoliang Ji, Beijing (CN); Xiaoxiao Chen, Beijing (CN); Yang Wang, Beijing (CN); Wenjun Xiao, Beijing (CN); Ji Dong, Beijing (CN); Hao Xu, Beijing (CN); Wenkai Mu, Beijing (CN); Bingqing Yang, Beijing (CN); Yi Liu, Beijing (CN)

(73) Assignees: BEIJING BOE DISPLAY TECHNOLOGY CO., LTD., Beijing (CN); BOE TECHNOLOGY GROUP CO.. LTD., Beijing (CN)

( * ) Notice: Subject to any disclaimer, the term of this patent is extended or adjusted under 35 U.S.C. 154(b) by 0 days.

(21) Appl. No.: 16/930,188

(22) Filed: Jul. 15, 2020

(65) Prior Publication Data
US 2021/0055612 A1  Feb. 25, 2021

(30) Foreign Application Priority Data
Aug. 22, 2019 (CN) .......................... 201910777377.0

(51) Int. Cl.
*G09G 3/30* (2006.01)
*G09G 3/36* (2006.01)
*G02F 1/1343* (2006.01)

(52) U.S. Cl.
CPC .. *G02F 1/134336* (2013.01); *G02F 2201/121* (2013.01); *G02F 2201/123* (2013.01)

(58) Field of Classification Search
CPC ................... G09G 3/18; G09G 3/2003; G09G 3/3406–3696; G09G 5/02;
(Continued)

(56) References Cited

U.S. PATENT DOCUMENTS

| | | | |
|---|---|---|---|
| 2009/0027325 A1* | 1/2009 | Kim ..................... | G09G 3/3696 345/92 |
| 2011/0006975 A1* | 1/2011 | Nagashima .......... | G09G 3/3655 345/92 |
| 2020/0271987 A1* | 8/2020 | Park ................... | G02F 1/134363 |

* cited by examiner

*Primary Examiner* — Sanghyuk Park
(74) *Attorney, Agent, or Firm* — McCoy Russell LLP

(57) ABSTRACT

The present disclosure provides an array substrate, a liquid crystal light control structure and a liquid crystal display panel. The array substrate includes: a base substrate; a plurality of data lines arranged on the base substrate along a first direction; and a plurality of pixel electrodes arranged in an array. Two of the plurality of pixel electrodes, which are adjacent in the first direction, are provided in different layers and insulated from each other. Orthographic projections of the two of the plurality of pixel electrodes, which are adjacent in the first direction, to the base substrate, adjoin each other with an adjoiner therebetween being covered by an orthographic projection of one of the plurality of data lines to the base substrate.

17 Claims, 5 Drawing Sheets

(58) Field of Classification Search
CPC .. G09G 2300/04–0495; G09G 2300/08–0895; G02F 1/134336; G02F 2201/121; G02F 2201/123
See application file for complete search history.

ARRAY SUBSTRATE, LIQUID CRYSTAL LIGHT CONTROL STRUCTURE AND LIQUID CRYSTAL DISPLAY PANEL HAVING ADJACENT PIXEL ELECTRODES WHOSE ORTHOGRAPHIC PROJECTIONS ON BASE SUBSTRATE ADJONING EACH OTHER

CROSS-REFERENCE TO RELATED APPLICATION

The present disclosure claims the benefit and priority of Chinese Application No. 201910777377.0, filed on Aug. 22, 2019, the disclosures of which are incorporated in their entirety by reference herein.

TECHNICAL FIELD

The present disclosure relates to the field of display technologies, and in particular to an array substrate, a liquid crystal light control structure and a liquid crystal display panel.

BACKGROUND

Liquid crystal display (LCD) panels have characteristics of low power consumption, high image quality, small size and light weight, and thus they are popular and have become the mainstream of the current display panels. However, the transmittance of LCDs in related art still needs to be improved.

SUMMARY

One embodiment of the present disclosure provides an array substrate, including: a base substrate; a plurality of data lines arranged on the base substrate along a first direction; and a plurality of pixel electrodes arranged in an array. Two of the plurality of pixel electrodes, which are adjacent in the first direction, are provided in different layers and insulated from each other. Orthographic projections of the two of the plurality of pixel electrodes, which are adjacent in the first direction, to the base substrate, adjoin each other with an adjoiner therebetween being covered by an orthographic projection of one of the plurality of data lines to the base substrate.

Optionally, edges of the orthographic projections of the two of the plurality of pixel electrodes, which are adjacent in the first direction, to the base substrate, coincide with each other at the adjoiner.

Optionally, there is an overlapping area between the orthographic projections of the two of the plurality of pixel electrodes, which are adjacent in the first direction, to the base substrate; the overlapping area covers the orthographic projection of one of the plurality of data lines to the base substrate.

Optionally, the array substrate further includes a plurality of gate lines arranged along a second direction perpendicular to the first direction; there is gap between orthographic projections of two of the plurality of pixel electrodes, which are adjacent in the second direction, to the base substrate.

Optionally, an orthographic projection of one of the plurality of gate lines to the base substrate covers an orthographic projection of a gap between the two of the plurality of pixel electrodes, which are adjacent in the second direction, to the base substrate; there is an overlapping area between the orthographic projection of one of the plurality of gate lines to the base substrate and the orthographic projections of two of the plurality of pixel electrodes, which are adjacent in the second direction, to the base substrate.

Optionally, the array substrate further includes a plurality of gate lines arranged along a second direction perpendicular to the first direction; two of the plurality of pixel electrodes, which are adjacent in the second direction, are provided in different layers and insulated from each other; adjacent edges of orthographic projections of the two of the plurality of pixel electrodes, which are adjacent in the second direction, to the base substrate, coincide with each other, or, there is an overlapping area between the orthographic projections of the two of the plurality of pixel electrodes, which are adjacent in the second direction, to the base substrate.

Optionally, the adjacent edges are covered by an orthographic projection of one of the plurality of gate lines to the base substrate; the overlapping area covers the orthographic projection of one of the plurality of gate lines to the base substrate.

Optionally, the array substrate further includes: a shield electrode layer between a layer where the plurality of data lines are located and layers where the plurality of pixel electrodes are located; an orthographic projection of the shield electrode layer to the base substrate covers an orthographic projection of each of the plurality of pixel electrodes to the base substrate.

One embodiment of the present disclosure provides a liquid crystal light control structure, including: the above array substrate and a counter substrate that are opposed to each other. The counter substrate includes a common electrode layer which is loaded with the same electrical signal as the shield electrode layer.

One embodiment of the present disclosure provides a liquid crystal display panel, including: a liquid crystal display structure and the above liquid crystal light control structure; wherein the liquid crystal display structure and the liquid crystal light control structure are stacked on each other.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
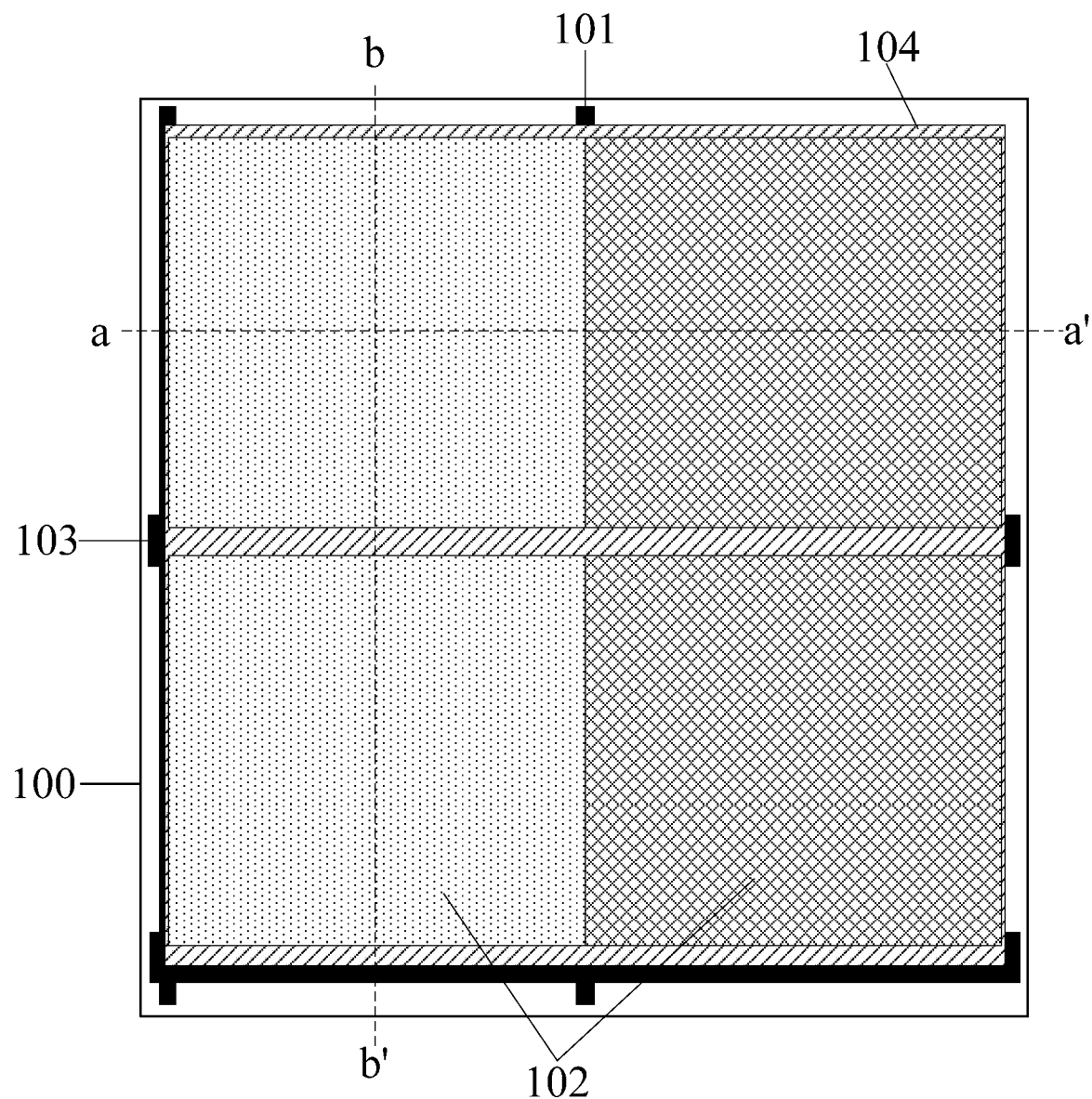
FIG. 1 is a first schematic top view of an array substrate according to an embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The shape and size of each film layer in the drawings do not reflect the true ratio, but only schematically illustrate contents of the present disclosure.

Contrast is an important performance parameter of LCD. In order to improve contrast, a dual cell liquid crystal display technology has emerged. The dual cell liquid crystal display technology is to use two layers of liquid crystal panels to display an image simultaneously, thereby improving the contrast of the image. Specifically, an upper liquid crystal panel displays a color image, and a lower liquid crystal panel displays a corresponding black and white image. However, due to the presence of the lower liquid crystal panel in the dual cell display technology, the transmittance of the LCD is decreased.

In view of this, embodiments of the present disclosure provide an array substrate, a liquid crystal light control structure and a liquid crystal display panel, which can improve the transmittance of the liquid crystal panel.

Figure 2:
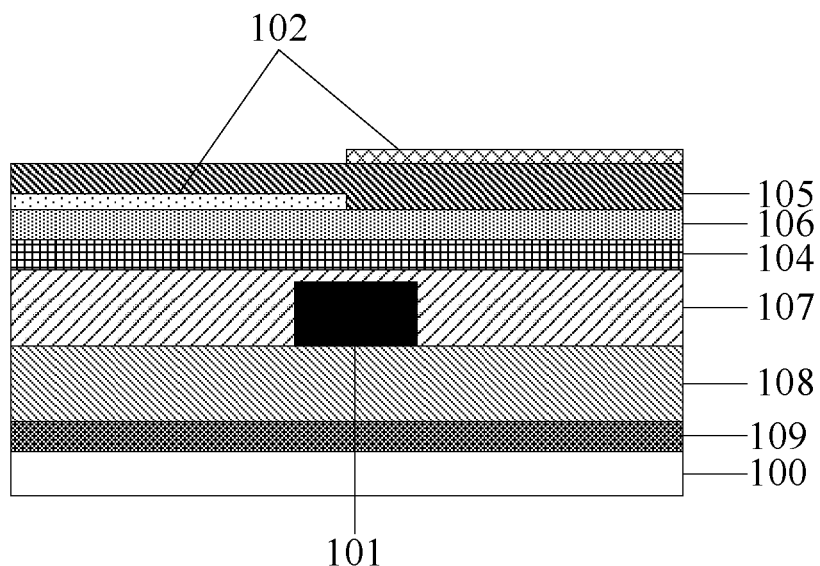
FIG. 2 is a first schematic cross-sectional view taken along a line aa' of FIG. 1.
Figure 3:
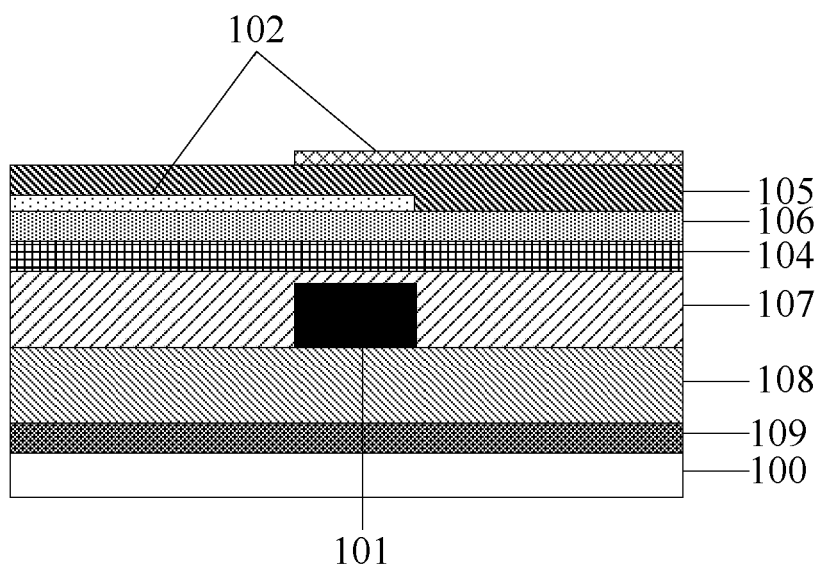
FIG. 3 is a second schematic cross-sectional view taken along a line aa' of FIG. 1.

As shown in FIG. 1 to FIG. 3, one embodiment of the present disclosure provides an array substrate, which includes a base substrate 100, multiple data lines 101 arranged on the base substrate 100 along a first direction, and multiple pixel electrodes 102 arranged in an array.

Two pixel electrodes 102, which are adjacent in the first direction, are provided in different layers and insulated from each other.

Orthographic projections of the two pixel electrodes 102, which are adjacent in the first direction, to the base substrate 100, adjoin each other with an adjoiner therebetween being covered by an orthographic projection of one data line 101 to the base substrate 100.

It should be noted that in the above array substrate according to one embodiment of the present disclosure, the orthographic projections of the two pixel electrodes 102, which are adjacent in the first direction, to the base substrate 100, adjoining each other, means that there is an overlapping area between the orthographic projections of the two pixel electrodes 102, which are adjacent in the first direction, to the base substrate 100, or means that adjacent edges of the orthographic projections of the two pixel electrodes 102, which are adjacent in the first direction, to the base substrate 100, coincide with each other. In other words, there is no gap between the orthographic projections of the two pixel electrodes 102, which are adjacent in the first direction, to the base substrate 100.

In the related art, there is a gap between adjacent pixel electrodes and the gap needs to be blocked by a data line, thus a line width of the data line is large. In the array substrate according to one embodiment of the present disclosure, two pixel electrodes 102, which are adjacent in the first direction (along which the data lines 101 are arranged), are provided in different layers so that there is no gap between the two pixel electrodes 102 which are adjacent in the first direction, and thus there is no need for the data line 101 to block a gap. In this way, the data line 101 with a smaller line width can be employed to increase an aperture ratio of the liquid crystal display panel, thereby improving the transmittance of the liquid crystal display panel.

In a specific implementation, in the above array substrate according to one embodiment of the present disclosure, in order to enable the line width of the data line 101 to be smaller, as shown in FIG. 2, adjacent edges of the orthographic projections of the two pixel electrodes 102 which are adjacent in the first direction (when oriented as shown in FIG. 2, the first direction is the left-right direction in FIG. 2), to the base substrate 100, coincide with each other at the adjoiner between the orthographic projections of the two pixel electrodes 102 which are adjacent in the first direction, to the base substrate 100. In this way, the orthographic projection of one data line 101 to the base substrate 100 only needs to cover the adjacent edges which coincide with each other at the adjoiner, and then the line width of the data line 101 is smaller, thereby improving the transmittance of the liquid crystal display panel. In addition, reducing the line width of the data line 101 can also improve the moire defects.

In a specific implementation, in the above array substrate according to one embodiment of the present disclosure, in order to enable the line width of the data line 101 to be smaller, as shown in FIG. 3, there may be an overlapping area between the orthographic projections of the two pixel electrodes 102, which are adjacent in the first direction, to the base substrate 100, and the overlapping area covers the orthographic projection of one data line 101 to the base substrate 100.

It is understandable that since the overlapping area between the orthographic projections of the two pixel electrodes 102, which are adjacent in the first direction, to the base substrate 100, covers the orthographic projection of one data line 101 to the base substrate 100, it can prevent light leakage caused by offset of the pixel electrodes 102 in the first direction due to process fluctuations.

Figure 4:
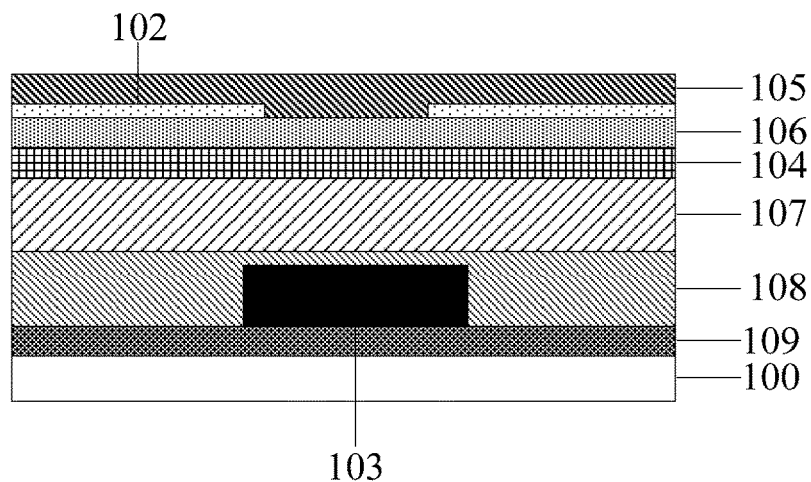
FIG. 4 is a schematic cross-sectional view taken along a line bb' of FIG. 1.

In a specific implementation, in the above array substrate according to one embodiment of the present disclosure, as shown in FIG. 1 and FIG. 4, the array substrate may further include multiple gate lines 103 arranged along a second direction perpendicular to the first direction.

Two pixel electrodes 102, which are adjacent in the second direction, are provided in the same layer with a gap defined therebetween, thereby avoiding interference between signals loaded on the two pixel electrodes 102.

In a specific implementation, in the above array substrate according to one embodiment of the present disclosure, in order to prevent light leakage caused by offset of the pixel electrodes 102 in the second direction due to process fluctuations, as shown in FIG. 4, an orthographic projection of each gate line 3 to the base substrate 100 covers an orthographic projection of a gap between two pixel electrodes 102 which are adjacent in the second direction to the base substrate 100, and there is an overlapping area between the orthographic projection of each gate line 3 to the base substrate 100 and orthographic projections of the two pixel electrodes 102 which are adjacent in the second direction to the base substrate 100. Further, the orthographic projections of the two pixel electrodes 102 which are adjacent in the second direction to the base substrate 100, do not completely overlap with the orthographic projection of one gate line 103 to the substrate 100, thus, an interference of a signal loaded on the gate line 103 to a signal loaded on the pixel electrodes 102 can be effectively avoided.

Figure 5:
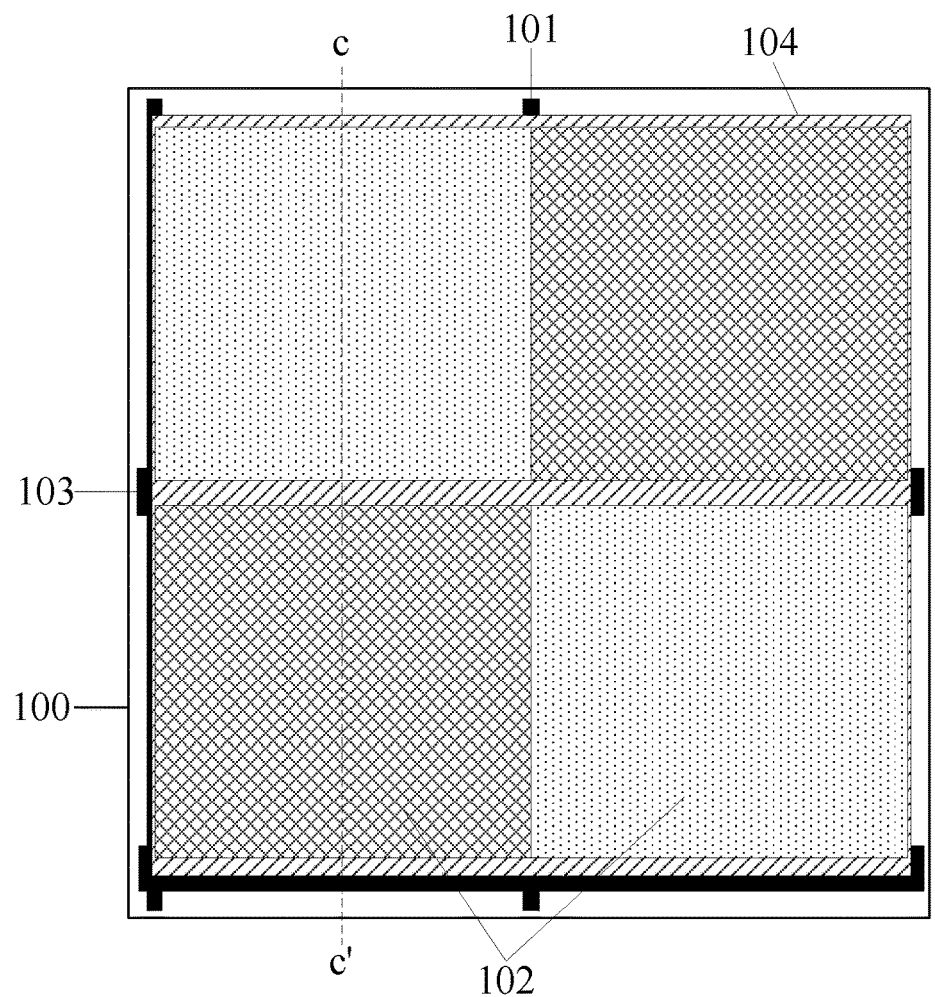
FIG. 5 is a second schematic top view of an array substrate according to an embodiment of the present disclosure.
Figure 6:
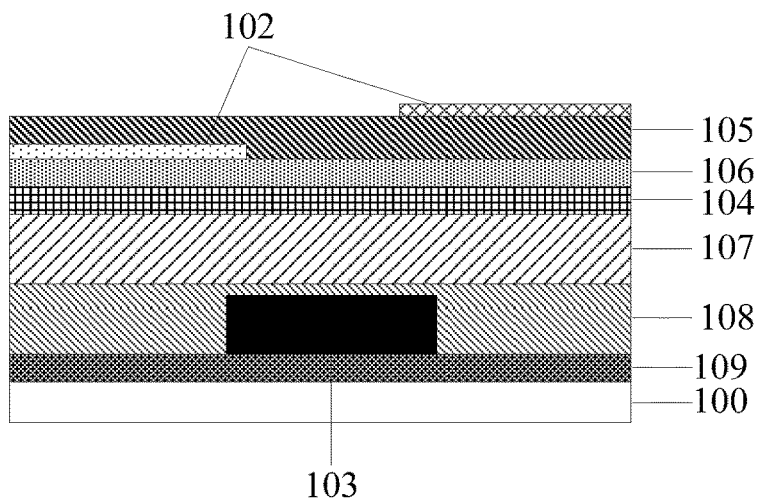
FIG. 6 is a schematic cross-sectional view taken along a line cc' of FIG. 5.

In a specific implementation, in the above array substrate according to one embodiment of the present disclosure, as shown in FIG. 5 and FIG. 6, the array substrate may further include multiple gate lines 103 arranged along a second direction perpendicular to the first direction.

Two pixel electrodes 102, which are adjacent in the second direction, are provided in different layers. There is a gap between orthographic projections of the two pixel electrodes 102, which are adjacent in the second direction, to the base substrate 100.

In a specific implementation, in the above array substrate according to one embodiment of the present disclosure, in order to prevent light leakage caused by offset of the pixel electrodes 102 in the second direction due to process fluctuations, as shown in FIG. 6, an orthographic projection of each gate line 3 to the base substrate 100 covers an orthographic projection of a gap between two pixel electrodes 102 which are adjacent in the second direction to the base substrate 100, and there is an overlapping area between the orthographic projection of each gate line 3 to the base substrate 100 and orthographic projections of the two pixel electrodes 102 which are adjacent in the second direction to the base substrate 100. Further, the orthographic projections of the two pixel electrodes 102 which are adjacent in the second direction to the base substrate 100, do not completely overlap with the orthographic projection of one gate line 103 to the substrate 100, thus, an interference of a signal loaded on the gate line 103 to a signal loaded on the pixel electrodes 102 can be effectively avoided.

Figure 7:
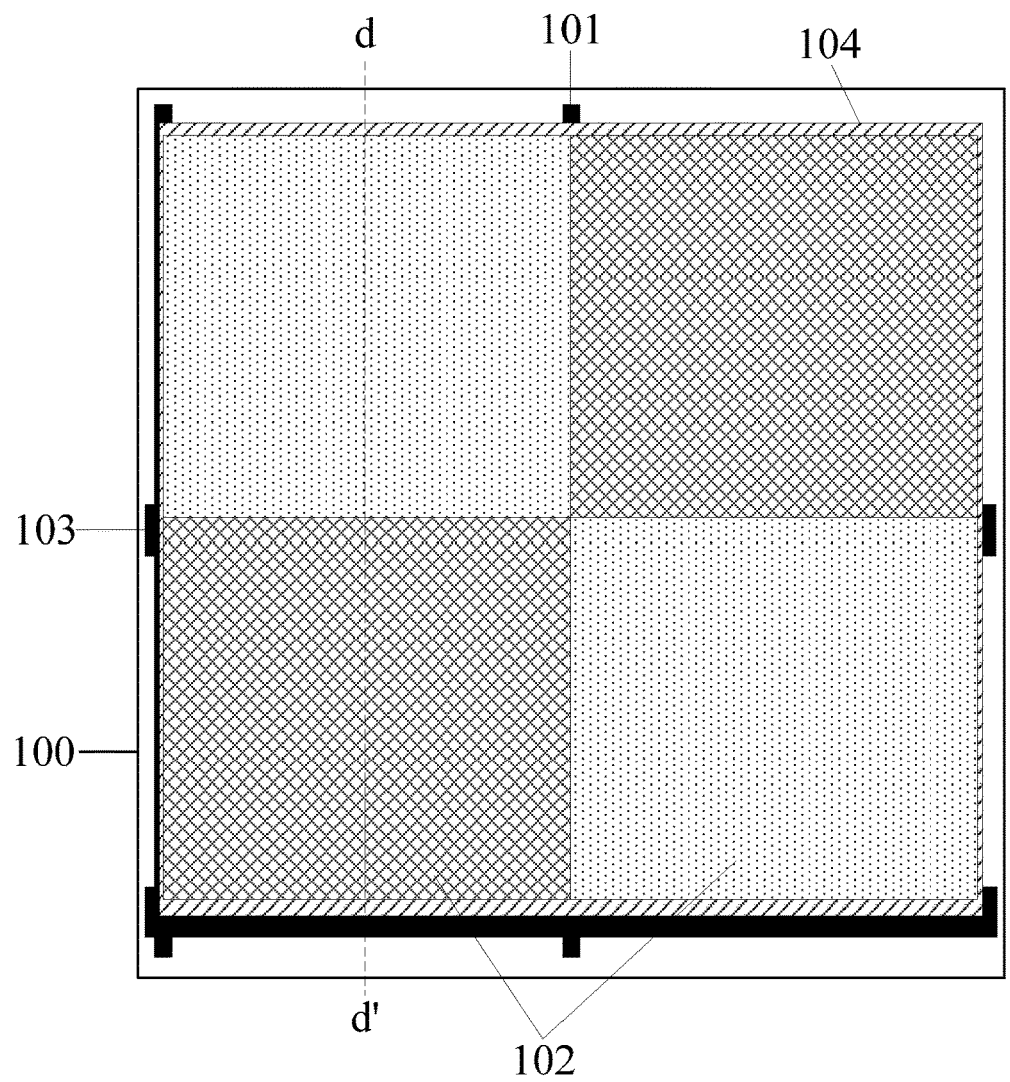
FIG. 7 is a third schematic top view of an array substrate according to an embodiment of the present disclosure.
Figure 8:
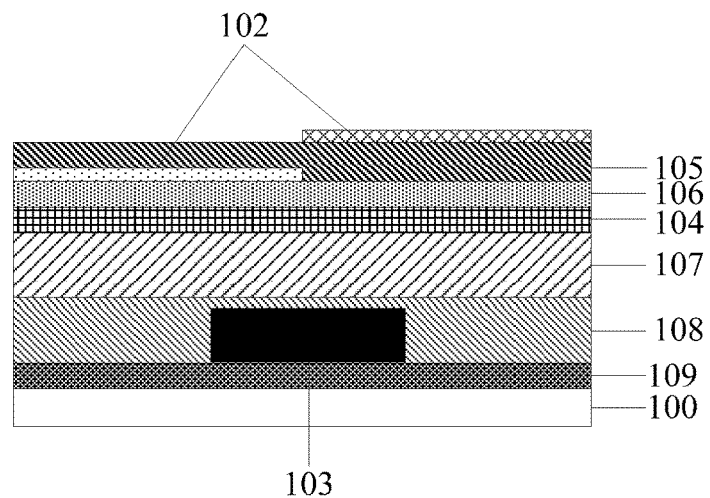
FIG. 8 is a first schematic cross-sectional view taken along a line dd' of FIG. 7.
Figure 9:
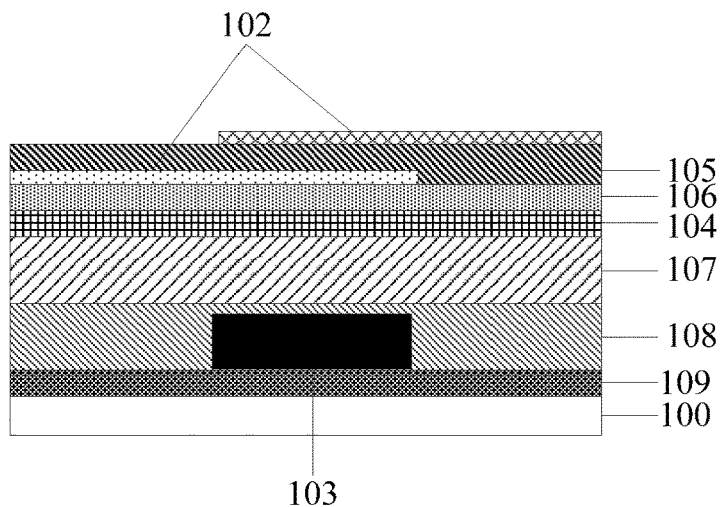
FIG. 9 is a second schematic cross-sectional view taken along a line dd' of FIG. 7.

In a specific implementation, in the above array substrate according to one embodiment of the present disclosure, as shown in FIG. 7 to FIG. 9, the array substrate may further include multiple gate lines 103 arranged along a second direction perpendicular to the first direction.

Two pixel electrodes 102, which are adjacent in the second direction, are provided in different layers and insulated from each other. Adjacent edges of orthographic projections of the two pixel electrodes 102 which are adjacent in the second direction, to the base substrate 100, coincide with each other (as shown in FIG. 8), or, there is an overlapping area between the orthographic projections of the two pixel electrodes 102, which are adjacent in the second direction, to the base substrate 100 (as shown in FIG. 9).

In the related art, there is a gap between adjacent pixel electrodes and the gap needs to be blocked by a gate line, thus a line width of the gate line is large. In the array substrate according to one embodiment of the present disclosure, there is no gap between the two pixel electrodes 102 which are adjacent in the second direction (along which the gate lines 103 are arranged), and thus there is no need for the gate line 103 to block a gap. In this way, the gate line 103 with a smaller line width can be employed to increase an aperture ratio of the liquid crystal display panel, thereby improving the transmittance of the liquid crystal display panel.

In a specific implementation, in the above array substrate according to one embodiment of the present disclosure, in order to enable the line width of the gate line 103 to be smaller, as shown in FIG. 8, an orthographic projection of each gate line 3 to the base substrate 100 may cover adjacent coincident edges of the orthographic projections of the two pixel electrodes 102 which are adjacent in the second direction, to the base substrate 100. Alternatively, as shown in FIG. 9, the overlapping area between the orthographic projections of the two pixel electrodes 102, which are adjacent in the second direction, to the base substrate 100, covers an orthographic projection of one gate line 3 to the base substrate 100.

It is understandable that since the overlapping area between the orthographic projections of the two pixel electrodes 102, which are adjacent in the second direction, to the base substrate 100, covers the orthographic projection of one gate line 103 to the base substrate 100, it can prevent light leakage caused by offset of the pixel electrodes 102 in the second direction due to process fluctuations.

In a specific implementation, in the above array substrate according to one embodiment of the present disclosure, in order to avoid interference of signals loaded on the data line 101 and the gate line 103 to a signal loaded on the pixel electrode 102, as shown in FIG. 1 to FIG. 9, the array substrate may further include a shield electrode layer 104 between a layer where each pixel electrode 102 is located and a layer where each data line 101 is located.

An orthographic projection of the shield electrode layer 104 to the base substrate 100 covers an orthographic projection of each pixel electrode 102 to the base substrate 100.

Further, in the above array substrate according to one embodiment of the present disclosure, capacitance (Cst) compensation may be formed between the shield electrode layer 104 and each pixel electrode 102, thereby reducing a value of $C_{pd}/C_{total}$ and then preventing poor crosstalk in a display screen of the liquid crystal display panel, where $C_{pd}$ represents parasitic capacitance between a pixel electrode 102 and its adjacent data line 101 that does not charge the pixel electrode 102, and $C_{total}$ represents total parasitic capacitance of the pixel electrode 102.

In a specific implementation, in the above array substrate according to one embodiment of the present disclosure, in order to achieve insulation between the pixel electrodes 102 provided in different layers, as shown in FIG. 2 to FIG. 4, FIG. 6, FIG. 8 and FIG. 9, the array substrate may further include an insulation layer 105 located between layers where various pixel electrodes 102 which are provided in different layers and insulated from each other, are located.

Optionally, in the above array substrate according to one embodiment of the present disclosure, as shown in FIG. 2 to FIG. 4, FIG. 6, FIG. 8 and FIG. 9, the array substrate may further include: a first insulating layer 106 between the shield electrode layer 104 and the layer where each pixel electrode 102 is located, a planarization layer 107, an interlayer dielectric layer 108 and a gate insulating layer 109. The planarization layer 107, the interlayer dielectric layer 108 and the gate insulating layer 109 are sequentially disposed on one side of the shield electrode layer 104 distal to the first insulating layer 106. Further, the layer where the data line 101 is located is located between the planarization layer 107 and the interlayer dielectric layer 108, and the layer where the gate line 103 is located is located between the interlayer dielectric layer 108 and the gate insulating layer 109.

Figure 10:
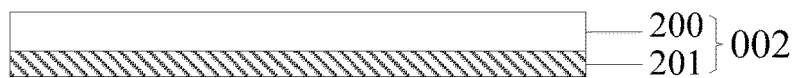
FIG. 10 is a schematic cross-sectional view of a liquid crystal light control structure according to an embodiment of the present disclosure.
Figure 10:
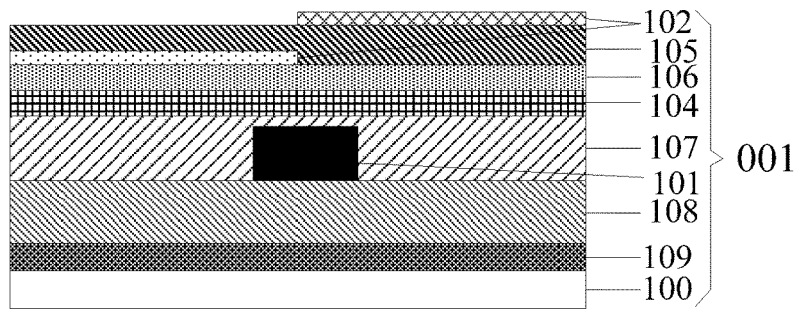

Based on the same inventive concept, one embodiment of the present disclosure provides a liquid crystal light control structure. As shown in FIG. 10, the liquid crystal light control structure includes: an array substrate 001 and a counter substrate 002 that are opposed to each other. The array substrate employs the above array substrate. Since the principle of the liquid crystal light control structure to solve the problem is similar to the principle of the above array substrate to solve the problem, the implementation of the liquid crystal light control structure according to one embodiment of the present disclosure may refer to the implementation of the above array substrate according to one embodiment of the present disclosure, which will not be elaborated herein.

In a specific implementation, in the above liquid crystal light control structure, as shown in FIG. 10, the counter substrate 002 includes a first base substrate 200 and a common electrode layer 201 on the first base substrate 200. The common electrode layer 201 is loaded with the same electrical signal as the shield electrode layer 104. Since the shield electrode layer 104 is loaded with the same electrical signal as the common electrode layer 201, pulling of the pixel electrode 102 by the gate line 103 and the data line 101 is effectively avoided.

Optionally, in the above liquid crystal light control structure, the liquid crystal light control structure may further include a liquid crystal layer between the array substrate 001 and the counter substrate 002.

It should be noted that in the above liquid crystal light control structure according to one embodiment of the present disclosure, there is an overlapping area between an orthographic projection of each data line 101 to the base substrate 100 and orthographic projections of the two pixel electrodes 102, which are on the array substrate 001 and adjacent in the first direction, to the base substrate 100; and there is an overlapping area between an orthographic projection of each gate line 103 to the base substrate 100 and orthographic projections of the two pixel electrodes 102, which are adjacent in the second direction, to the base substrate 100. This can effectively prevent light leakage caused by offset of the pixel electrodes 102 due to process fluctuations, and then there is no need to provide a black matrix (BM) on the counter substrate 002 to block light leakage between adjacent pixel electrodes 102. Therefore, the aperture ratio of the liquid crystal display panel can be further increased, thereby further improving the transmittance of the liquid crystal display panel.

Based on the same inventive concept, one embodiment of the present disclosure provides a liquid crystal display panel. The liquid crystal display panel includes a liquid crystal display structure and a liquid crystal light control structure which are stacked on each other. The liquid crystal light control structure may employ the above liquid crystal light control structure. The liquid crystal display panel may be applied to any product or component having display function, such as a mobile phone, a tablet computer, a television, a monitor, a notebook computer, a digital photo frame, a navigator, a smart watch, a fitness wristband, a personal digital assistant. Since the principle of the liquid crystal display panel to solve the problem is similar to the principle of the above liquid crystal light control structure to solve the problem, the implementation of the liquid crystal display panel according to one embodiment of the present disclosure may refer to the implementation of the above liquid crystal light control structure according to one embodiment of the present disclosure, which will not be elaborated herein.

Each of the array substrate, the liquid crystal light control structure and the liquid crystal display panel includes a base substrate, multiple data lines arranged on the base substrate along a first direction, and multiple pixel electrodes arranged in an array. Two pixel electrodes, which are adjacent in the first direction, are provided in different layers and insulated from each other. Orthographic projections of the two pixel electrodes, which are adjacent in the first direction, to the base substrate, adjoin each other with an adjoiner therebetween being covered by an orthographic projection of one data line to the base substrate. Since there is a gap between adjacent pixel electrodes and the gap needs to be blocked by a data line in the related art, thus a line width of the data line is large. In one embodiment of the present disclosure, two pixel electrodes, which are adjacent in the first direction (along which the data lines are arranged), are provided in different layers so that there is no gap between the two pixel electrodes which are adjacent in the first direction, and thus there is no need for the data line to block a gap. In this way, the data line with a smaller line width can be employed to increase an aperture ratio of the liquid crystal display panel, thereby improving the transmittance of the liquid crystal display panel.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

The invention claimed is:

1. An array substrate, comprising:
a base substrate;
a plurality of data lines arranged on the base substrate along a first direction; and
a plurality of pixel electrodes arranged in an array;
wherein two of the plurality of pixel electrodes, which are adjacent in the first direction, are provided in different layers and insulated from each other;
orthographic projections of the two of the plurality of pixel electrodes, which are adjacent in the first direction, to the base substrate, adjoin each other with an adjoiner therebetween being covered by an orthographic projection of one of the plurality of data lines to the base substrate.

2. The array substrate according to claim 1, wherein edges of the orthographic projections of the two of the plurality of pixel electrodes, which are adjacent in the first direction, to the base substrate, coincide with each other at the adjoiner.

3. The array substrate according to claim 1, wherein there is an overlapping area between the orthographic projections of the two of the plurality of pixel electrodes, which are adjacent in the first direction, to the base substrate;
the overlapping area covers the orthographic projection of one of the plurality of data lines to the base substrate.

4. The array substrate according to claim 1, wherein the array substrate further includes a plurality of gate lines arranged along a second direction perpendicular to the first direction;
there is gap between orthographic projections of two of the plurality of pixel electrodes, which are adjacent in the second direction, to the base substrate.

5. The array substrate according to claim 4, wherein an orthographic projection of one of the plurality of gate lines to the base substrate covers an orthographic projection of a gap between the two of the plurality of pixel electrodes, which are adjacent in the second direction, to the base substrate;
there is an overlapping area between the orthographic projection of one of the plurality of gate lines to the base substrate and the orthographic projections of two of the plurality of pixel electrodes, which are adjacent in the second direction, to the base substrate.

6. The array substrate according to claim 1, wherein the array substrate further includes a plurality of gate lines arranged along a second direction perpendicular to the first direction;
two of the plurality of pixel electrodes, which are adjacent in the second direction, are provided in different layers and insulated from each other;
adjacent edges of orthographic projections of the two of the plurality of pixel electrodes, which are adjacent in the second direction, to the base substrate, coincide with each other, or, there is an overlapping area between the orthographic projections of the two of the plurality of pixel electrodes, which are adjacent in the second direction, to the base substrate.

7. The array substrate according to claim 6, wherein the adjacent edges are covered by an orthographic projection of one of the plurality of gate lines to the base substrate;
the overlapping area covers the orthographic projection of one of the plurality of gate lines to the base substrate.

8. The array substrate according to claim 1, wherein the array substrate further includes: a shield electrode layer between a layer where the plurality of data lines are located and layers where the plurality of pixel electrodes are located;
an orthographic projection of the shield electrode layer to the base substrate covers an orthographic projection of each of the plurality of pixel electrodes to the base substrate.

9. A liquid crystal light control structure, comprising:
an array substrate and a counter substrate that are opposed to each other;
wherein the array substrate includes:
a base substrate;
a plurality of data lines arranged on the base substrate along a first direction; and
a plurality of pixel electrodes arranged in an array;
wherein two of the plurality of pixel electrodes, which are adjacent in the first direction, are provided in different layers and insulated from each other;
orthographic projections of the two of the plurality of pixel electrodes, which are adjacent in the first direction, to the base substrate, adjoin each other with an adjoiner therebetween being covered by an orthographic projection of one of the plurality of data lines to the base substrate;
wherein the array substrate further includes: a shield electrode layer between a layer where the plurality of data lines are located and layers where the plurality of pixel electrodes are located;
the counter substrate includes a common electrode layer which is loaded with a same electrical signal as the shield electrode layer.

10. The liquid crystal light control structure according to claim 9, wherein edges of the orthographic projections of the two of the plurality of pixel electrodes, which are adjacent in the first direction, to the base substrate, coincide with each other at the adjoiner.

11. The liquid crystal light control structure according to claim 9, wherein there is an overlapping area between the orthographic projections of the two of the plurality of pixel electrodes, which are adjacent in the first direction, to the base substrate;
the overlapping area covers the orthographic projection of one of the plurality of data lines to the base substrate.

12. The liquid crystal light control structure according to claim 9, wherein the array substrate further includes a plurality of gate lines arranged along a second direction perpendicular to the first direction;
there is gap between orthographic projections of two of the plurality of pixel electrodes, which are adjacent in the second direction, to the base substrate.

13. The liquid crystal light control structure according to claim 12, wherein an orthographic projection of one of the plurality of gate lines to the base substrate covers an orthographic projection of a gap between the two of the plurality of pixel electrodes, which are adjacent in the second direction, to the base substrate;
there is an overlapping area between the orthographic projection of one of the plurality of gate lines to the base substrate and the orthographic projections of two of the plurality of pixel electrodes, which are adjacent in the second direction, to the base substrate.

14. The liquid crystal light control structure according to claim 9, wherein the array substrate further includes a plurality of gate lines arranged along a second direction perpendicular to the first direction;
two of the plurality of pixel electrodes, which are adjacent in the second direction, are provided in different layers and insulated from each other;
adjacent edges of orthographic projections of the two of the plurality of pixel electrodes, which are adjacent in the second direction, to the base substrate, coincide with each other, or, there is an overlapping area between the orthographic projections of the two of the plurality of pixel electrodes, which are adjacent in the second direction, to the base substrate.

15. The liquid crystal light control structure according to claim 14, wherein the adjacent edges are covered by an orthographic projection of one of the plurality of gate lines to the base substrate;
the overlapping area covers the orthographic projection of one of the plurality of gate lines to the base substrate.

16. The liquid crystal light control structure according to claim 9, wherein an orthographic projection of the shield electrode layer to the base substrate covers an orthographic projection of each of the plurality of pixel electrodes to the base substrate.

17. A liquid crystal display panel, comprising:
a liquid crystal display structure and the liquid crystal light control structure according to claim 9; wherein the liquid crystal display structure and the liquid crystal light control structure are stacked on each other.

* * * * *